United States Patent
Nadipuram et al.

(10) Patent No.: US 7,304,829 B2
(45) Date of Patent: Dec. 4, 2007

(54) APPARATUS AND METHOD FOR FILTERING CURRENT SENSOR OUTPUT SIGNALS

(75) Inventors: Venkat Nadipuram, Bangalore (IN); Deepak Raina, Bangalore (IN)

(73) Assignee: General Electric Company, Schenectady, NY (US)

( * ) Notice: Subject to any disclaimer, the term of this patent is extended or adjusted under 35 U.S.C. 154(b) by 27 days.

(21) Appl. No.: 10/906,363

(22) Filed: Feb. 16, 2005

(65) Prior Publication Data

US 2006/0181829 A1    Aug. 17, 2006

(51) Int. Cl.
*H02H 3/08*    (2006.01)

(52) U.S. Cl. ............ 361/93.2; 361/93.6; 324/424

(58) Field of Classification Search ...... 361/93.1–93.2, 361/93.5–93.7, 95–97; 327/552; 333/176, 333/181; 324/418–419, 424, 615, 623, 76.44; 702/57–76
See application file for complete search history.

(56) References Cited

U.S. PATENT DOCUMENTS

| | | | | |
|---|---|---|---|---|
| 4,631,625 A | * | 12/1986 | Alexander et al. | ............ 361/94 |
| 4,644,438 A | * | 2/1987 | Puccinelli et al. | ............ 361/75 |
| 4,903,163 A | * | 2/1990 | Atwater et al. | ............ 361/113 |
| 4,906,928 A | * | 3/1990 | Gard | ......................... 324/240 |
| 5,508,623 A | * | 4/1996 | Heydt et al. | ................ 324/623 |
| 5,568,371 A | * | 10/1996 | Pitel et al. | ..................... 363/39 |
| 6,175,479 B1 | | 1/2001 | Boyd et al. | ................... 361/96 |
| 6,295,910 B1 | * | 10/2001 | Childs et al. | ............ 83/698.11 |
| 6,313,639 B1 | * | 11/2001 | Griepentrog | ................ 324/500 |
| 6,559,648 B2 | * | 5/2003 | Baumgaertl et al. | ........ 324/424 |
| 6,617,858 B1 | * | 9/2003 | Baumgaertl et al. | ........ 324/522 |
| 2003/0107380 A1 | | 6/2003 | Leprette et al. | ............. 324/511 |
| 2004/0227502 A1 | * | 11/2004 | Wyse et al. | ............. 324/117 R |
| 2005/0122654 A1 | * | 6/2005 | Culligan et al. | ........... 361/93.1 |

FOREIGN PATENT DOCUMENTS

| | | |
|---|---|---|
| EP | 1318586 A1 | 6/2003 |
| WO | WO 99/03183 | 1/1999 |

OTHER PUBLICATIONS

Jim Karki, "Active Low-pass Filter Design", Sep. 2002, Texas Instruments, pp. 21 and 23.*
Don Lancaster, "Active-Filter Cookbook", 1975 by SAMS, A Division of Prentice Hall Computer Publishing, pp. 205-207.*

* cited by examiner

*Primary Examiner*—Michael Sherry
*Assistant Examiner*—Terrence R. Willoughby
(74) *Attorney, Agent, or Firm*—Cantor Colburn LLP

(57) ABSTRACT

An electronic filter for filtering the output signal of a current sensor of a circuit breaker is disclosed. The current sensor has an output signal characteristic similar to that of a Rogowski coil output signal characteristic that includes a third harmonic noise component in response to a switching primary current of the circuit breaker, and the circuit breaker has an electronic trip unit with an instantaneous pick-up setting responsive to the output signal of the current sensor. The electronic filter includes a first stage and a second stage. The first stage has a first transfer function that defines first characteristic poles and permits passage of the third harmonic noise component. The second stage has a second transfer function that defines second characteristic poles and filters the third harmonic noise component.

19 Claims, 4 Drawing Sheets

APPARATUS AND METHOD FOR FILTERING CURRENT SENSOR OUTPUT SIGNALS

BACKGROUND OF THE INVENTION

The present disclosure relates generally to an apparatus and method for filtering current sensor output signals, and particularly to an apparatus and method for filtering the output signals of a Rogowski coil type current sensor.

Electronic circuit breakers with electronic trip units often employ a Rogowski coil current sensor for producing a signal representative of the primary current passing through the circuit breaker to a protected circuit downstream of the circuit breaker. The current sensor output signal is passed to a processing circuit within the trip unit where an integration routine is performed for rms (root-mean-square) analysis of the primary current. Short-time and long-time trip sequences are initiated by the trip unit in response to the rms analysis indicating an over current and/or over heating condition in the protected circuit. An instantaneous trip sequence may also be initiated at the trip unit in response to the current sensor output signal indicating an instantaneous over current condition in the protected circuit in excess of an instantaneous trip threshold. However, since a Rogowski coil produces an output voltage that is proportional to the d(i(t))/dt of the primary current, a primary current having a harmonic content may result in an output signal from the Rogowski coil that is not accurately representative of the actual instantaneous primary current. In an effort to resolve such inaccuracies in the instantaneous trip regime of electronic circuit breakers, supplemental magnetic trip systems may be employed, which adds complexity and cost to the design of such circuit breakers. Accordingly, there remains a need in the art for an electronic circuit breaker that provides for a greater degree of accuracy in the instantaneous trip regime where Rogowski coil type current sensors are employed in situations where the primary current content may include higher order harmonics.

BRIEF DESCRIPTION OF THE INVENTION

Embodiments of the invention include an electronic filter for filtering the output signal of a current sensor of a circuit breaker, the current sensor having an output signal characteristic similar to that of a Rogowski coil output signal characteristic that includes a third harmonic noise component in response to a switching primary current of the circuit breaker, the circuit breaker having an electronic trip unit with an instantaneous pick-up setting responsive to the output signal of the current sensor. The electronic filter includes a first stage and a second stage. The first stage has a first transfer function that defines first characteristic poles and permits passage of the third harmonic noise component. The second stage has a second transfer function that defines second characteristic poles and filters the third harmonic noise component.

Other embodiments of the invention include an electronic trip unit for a circuit breaker having a current sensor with an output signal characteristic similar to that of a Rogowski coil output signal characteristic that includes a third harmonic noise component in response to a switching primary current of the circuit breaker. The electronic trip unit includes a two-stage filter, a comparator, and an actuating circuit. The two-stage filter is in signal communication with the output of the current sensor, the comparator is in signal communication with the output of the two-stage filter, and the actuating circuit is in signal communication with the output signal of the comparator. The electronic trip unit, having an instantaneous pick-up setting and being responsive to the filtered signal from the two-stage filter, has instantaneous pick-up accuracy equal to +/−10% of the instantaneous pick-up setting.

Further embodiments of the invention include a method of conditioning an output signal of a current sensor of an electronic circuit breaker, the current sensor having an output signal characteristic similar to that of a Rogowski coil output signal characteristic that includes a third harmonic noise component in response to a switching primary current of the circuit breaker, and the circuit breaker having an electronic trip unit with an instantaneous pick-up setting responsive to the output signal of the current sensor. The method includes: filtering the output signal of the current sensor to produce a first filtered signal; and filtering the first filtered signal to produce a second filtered signal, which is representative of the instantaneous primary current of the circuit breaker with an accuracy of equal to or greater than 90%.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a filter for an electronic trip unit of a circuit breaker, where the circuit breaker has a current sensor with an output signal characteristic similar to that of a Rogowski coil output signal characteristic that includes a third harmonic noise component in response to a switching primary current of the circuit breaker. In an embodiment, the current sensor may be a Rogowski coil current sensor that surrounds a primary current path in the circuit breaker. However, the scope of the invention is not limited to only Rogowski coil current sensors, and may include other current sensors that have similar output signal characteristics to that of a Rogowski coil current sensor. The filter is configured to provide an output signal that results in the electronic trip unit of the circuit breaker having instantaneous pick-up accuracy equal to +/−10% of the set pick-up value of the electronic trip unit.

Figure 1:
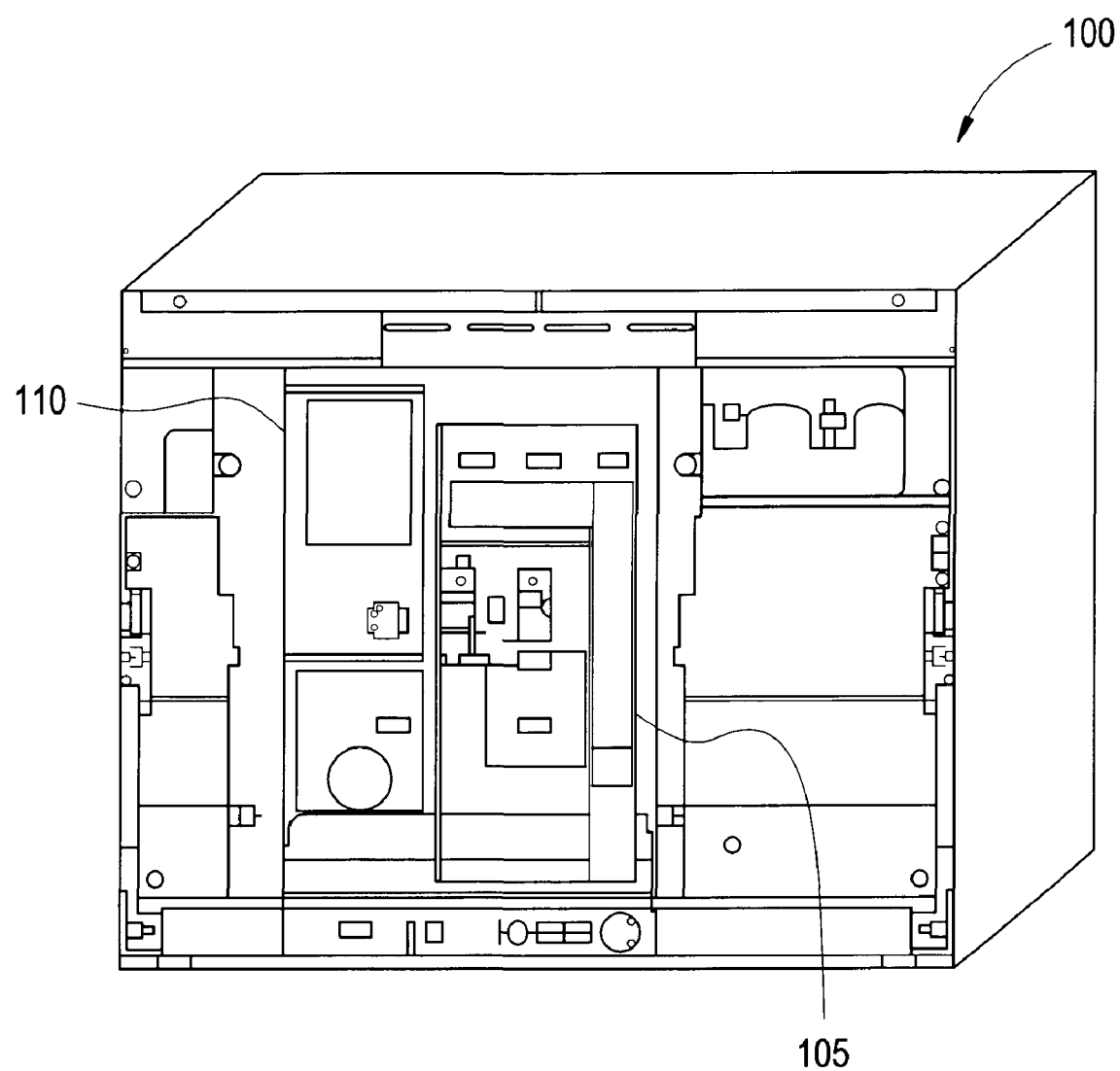
FIG. 1 depicts a block diagram representation of an exemplary embodiment of a circuit breaker for use in accordance with embodiments of the invention.

FIG. 1 is a block diagram representation of an exemplary embodiment of a circuit breaker 100 having an operating mechanism 105 and an electronic trip unit 110. In an embodiment, electronic trip unit 110 includes an instantaneous pick-up setting that is used to trigger a trip sequence at circuit breaker 100 in the event of an instantaneous over current condition in the protected circuit. The communication between mechanism 105 and trip unit 110 is best seen by now referring to FIG. 2, which depicts a line diagram representation of circuit breaker 100.

Figure 2:
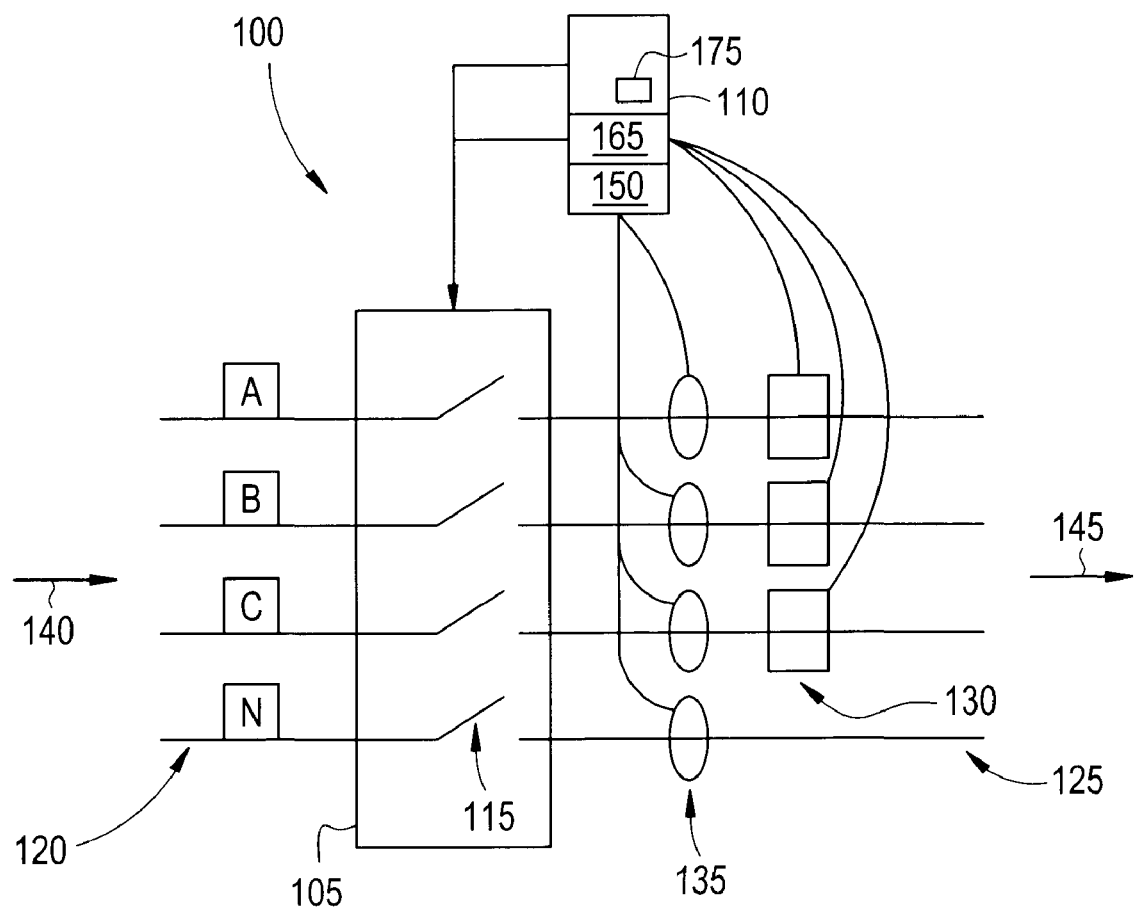
FIG. 2 depicts a line diagram representation of the circuit breaker of FIG. 1.

In FIG. 2, operating mechanism 105 serves to open and close A, B, C and N (three-phase and neutral phase) contacts 115, which are electrically connected to line conductors 120 and load conductors 125, thereby providing isolation to the load in response to an over current condition. Current transformers 130 provide power to electronic trip unit 110, and current sensors 135 provide a signal representative of the primary current passing through the circuit breaker 100 from line conductors 120 to load conductors 125. The line side primary current is represented by arrow 140, and the load side primary current is represented by arrow 145.

As previously discussed, current sensors 135 may be Rogowski coil current sensors, or they may be any other type of current sensor having an output signal characteristic similar to that of a Rogowski coil. Rogowski coil current sensors 135 have an output voltage signal that is proportional to the d(i(t))/dt of the primary current, and as such has an output signal characteristic that includes transients in response to the switching of the primary current at the circuit breaker 100. For example, in an embodiment where the switching of the primary current results in the presence of 88% of the third harmonic in the fundamental frequency (50 Hertz or 60 Hertz), the output voltage of the Rogowski coil will be a combination of the peak voltage due to the fundamental input primary current and the peak voltage due to the 88% of the third harmonic content present in the input primary current. As a result of the presence of the third harmonic, the output signal of the Rogowski coil current sensor 135 will not be an accurate representation of the instantaneous value of the primary current. It is the presence of these harmonic transients in the output signal of the Rogowski coil current sensors 135 that embodiments of the invention are intended to address. Accordingly, and as used hereinafter, reference to a Rogowski coil current sensor is intended to be a reference to any current sensor having an output signal characteristic similar to that of a Rogowski coil current sensor.

To suppress the third harmonic noise component present in the output signal of the Rogowski coil current sensors 135, a filter 150 is employed, which will now be described with reference to FIG. 3, which depicts a one-line diagram representation of the signal path from current sensor 135 to trip unit 110. In an embodiment, filter 150 suppresses the third harmonic noise component to such an extent that the electronic trip unit 110 has instantaneous pick-up accuracy equal to +/−10% of the set pick-up value, that is, in response to the pick-up value being set at 1000 amps, the instantaneous pick-up level will be not less than 900 amps and not greater than 1,100 amps.

Figure 3:
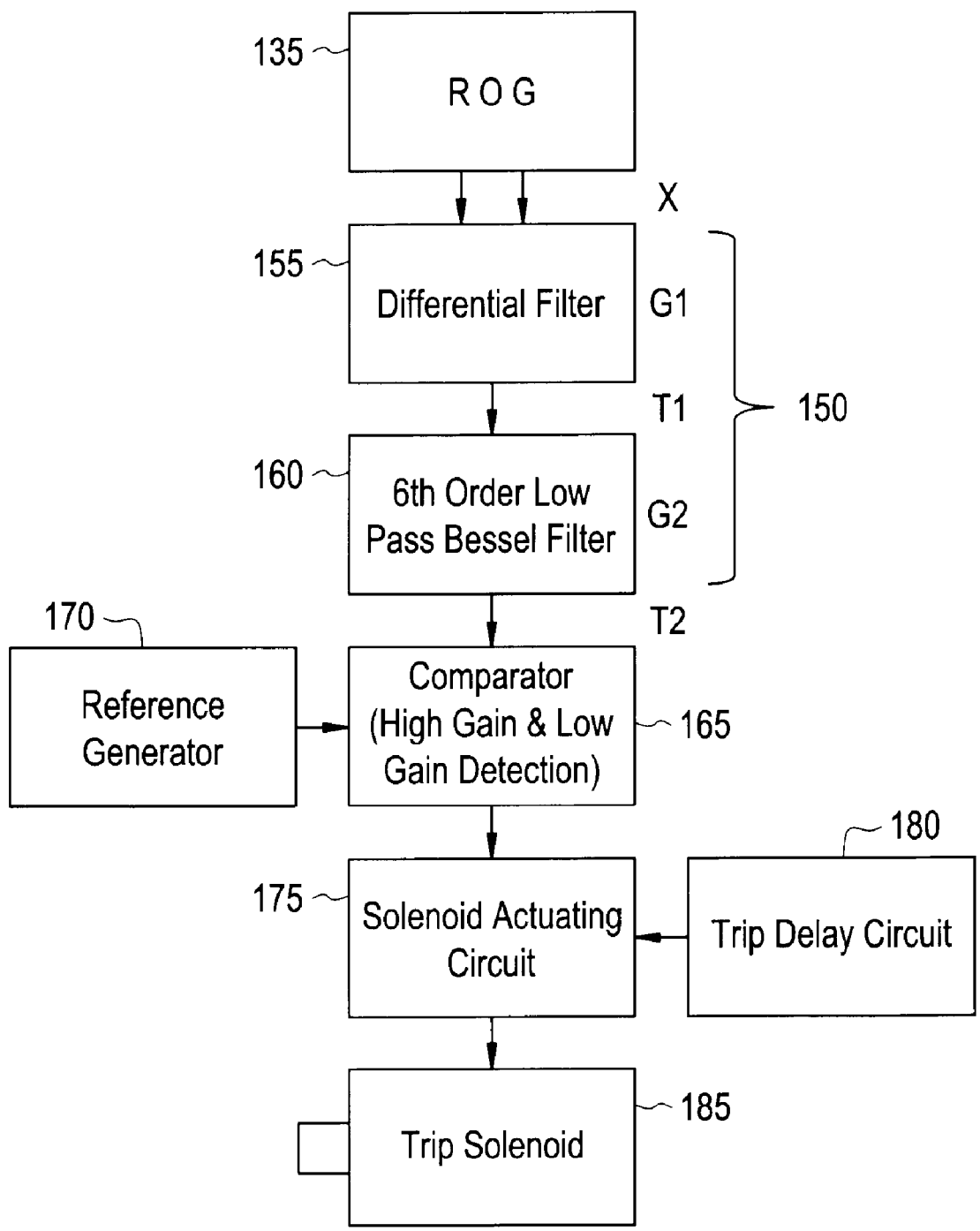
FIG. 3 depicts a one-line diagram representation of a signal path associated with the circuit breaker of FIG. 1 and in accordance with an embodiment of the invention.

Referring now to FIG. 3, filter 150 is a two-stage filter having a first stage 155 that is a differential low pass filter, and a second stage 160 that is a sixth order low pass Bessel filter. The input "X" to filter 150 is the output of Rogowski coil current sensor 135, and the output "T2" of filter 150 is the input to comparator 165, which is a high-gain, low-gain detection circuit. An auxiliary input to comparator 165 is a signal from reference generator 170, which establishes thresholds for the pick-up in the event of a fault occurring on a positive or a negative peak. The output of comparator 165 is the input to a trip solenoid actuating circuit 175 that trips the circuit breaker 100 via a trip solenoid 185 when fired. An auxiliary input to solenoid actuating circuit 175 is a signal from trip delay circuit 180, which may be set for selective tripping between cascaded circuit breakers. In an embodiment, the trip delay is set at 25 milliseconds (msec). In response to an accurate over current signal from sensor 135, filter 150, and comparator 165, trip unit 110 will initiate a trip action at mechanism 105 to open contacts 115. In an embodiment, filter 150 conditions the output signal from sensor 135 such that the over current signal from sensor 135, filter 150, and comparator 165, results in the electronic trip unit 110 having instantaneous pick-up accuracy of equal to +/−10% of the instantaneous pick-up setting. In an embodiment, filter 150, comparator 165 and actuating circuit 175 may all be integral to trip unit 110. While FIG. 3 depicts a one-line diagram, it will be appreciated that FIG. 3 is also illustrative of the signal path associated with a three-phase circuit breaker with switching neutral, such as that depicted in FIGS. 1 and 2.

The first stage 155 and the second stage 160 of filter 150 have first and second transfer functions G1 and G2, respectively. The first transfer function G1 permits passage of the third harmonic noise component from Rogowski coil current sensor 135, while the second transfer function G2 filters the third harmonic noise component. The output voltage signal from the first stage 155 of filter 150 is designated as "T1", resulting in T2/T1 being representative of the second transfer function G2.

The first and second transfer functions G1 and G2 will now be discussed by way of example with reference to FIGS. 4A, B and C, which depict a schematic illustrative of an embodiment of the differential low pass filter 155, the sixth order low pass Bessel filter 160, and the comparator 165 depicted in FIG. 3. However, it will be appreciated that the schematic of FIGS. 4A, B and C is for illustration purposes only, and that embodiments of the invention may be practiced using alternative arrangements of electronic components. Circled letters "P" and "Q" denote points of continuity between the schematics of FIGS. 4A, B and C. In an embodiment, the sixth order low pass Bessel filter 160 has a three-section repeat architecture 181, 182, 183.

Figure 4A:
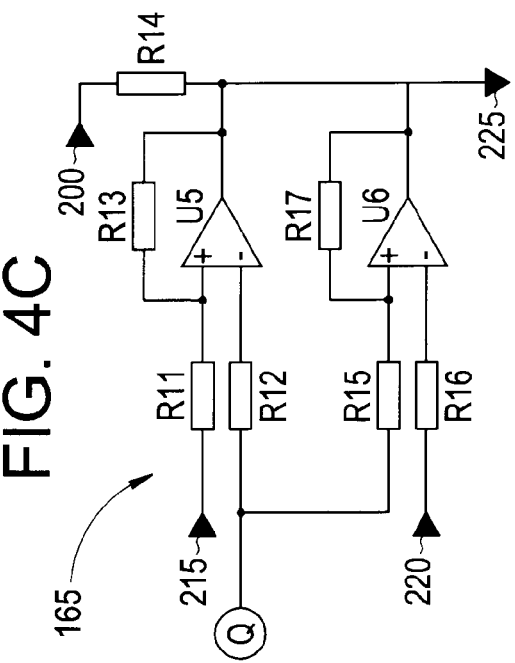
FIGS. 4A, B and C depict one phase of an exemplary differential low pass filter in combination with an exemplary sixth order low pass Bessel filter in combination with an exemplary comparator in accordance with an embodiment of the invention.
Figure 4C:
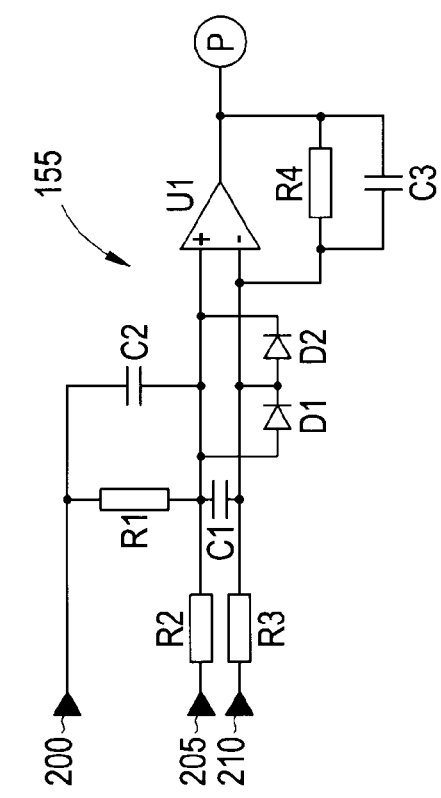
Figure 4B:
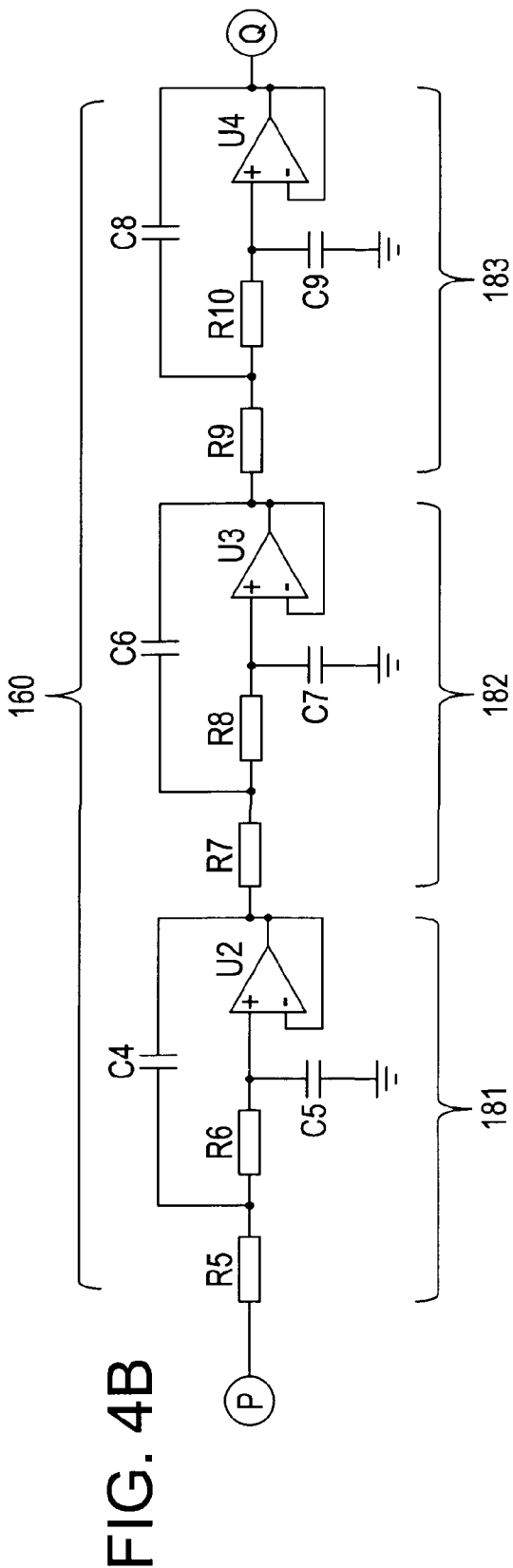

While FIGS. 4A, B and C depict the signal path in only one phase of circuit breaker 100, it will be appreciated and understood by one skilled in the art that similar schematics may be used for the other two phases, and coupled appropriately at the output side.

In FIGS. 4A, B and C, resistors are denoted by "Rx" where "x" represents a resistor reference numeral, capacitors are denoted by "Cy" where "y" represents a capacitor reference numeral, operational amplifiers (op amp) are denoted by "Uz" where "z" represents an op amp reference numeral, and diodes are denoted by "Dw" where "w" represents a diode reference numeral.

In FIGS. 4A, B and C, reference numeral 200 represents an instantaneous offset voltage signal from trip unit 110, reference numerals 205 and 210 represent the differential output voltage signal "X" from Rogowski coil 135, reference numerals 215 and 220 represent high and low, respectively, instantaneous threshold voltage signals from trip unit 110, and reference numeral 225 represents an instantaneous trip output signal from comparator 165 in response to the existence of a trip condition.

In an exemplary embodiment,
R1 and R4=221 kilo-ohm (kohm)
R2, R3 and R10=180 kohm
R5=18.7 kohm
R6=60.4 kohm
R7=21.5 kohm
R8=68.1 kohm
R9=30.1 kohm
R11, R12, R14, R15 and R16=10 kohm
R13=1 Mega-ohm (Mohm)

R17=1.6 Mohm,
C1=100 pico-Farads (pF)
C2 and C3=5.6 nano-Farads (nF)
C4, C6 and C8=68 nF
C5 and C7=47 nF
C9=10 nF.

However, it will be appreciated that alternative values may be used for the aforementioned electronic components depending of the desired accuracy.

In an embodiment, the first transfer function G1 has a frequency dependent gain value of:
G1=1.144 for 50 Hertz
G1=1.112 for 60 Hertz, and the second transfer function G2 has a frequency dependent gain defined by:

$$G2=1/[(1+a_1s+b_1s^2)(1+a_2s+b_2s^2)(1+a_3s+b_3s^2)],$$

where,
$a_1=(R5+R6)*C5$
$a_2=(R7+R8)*C7$
$a_3=(R9+R10)*C9$
$b_1=(R5*R6*C5*C4)$
$b_2=(R7*R8*C7*C6)$
$b_3=(R9*R10*C9*C8)$, and where $s=j\omega$.

In an embodiment, the second transfer function G2 has a frequency dependent gain value of:
G2=0.57261 at 50 Hertz
G2=0.449413 at 60 Hertz.

In an embodiment, the characteristic poles of the first and second stages are tuned such that all poles are on the left-hand side of the s-plane, thereby resulting in a stable system with no oscillations. In an embodiment, the six poles for the overall system of filters are:
Pole 1&2=−514.9428+−i108.8858
Pole 3&4=−449.9699+−i105.96494
Pole 5&6=−285.1334+−i436.0336.

Implementation of the filter 150 in circuit breaker 100 in accordance with embodiments of the invention will now be discussed by way of example.

In an exemplary embodiment, Rogowski coil current sensor 135 provides an output voltage signal X that is proportional to the amplitude and the frequency of the respective input primary current 140, where $$i(t)=A*\text{Sin}(\omega t), \text{ and}$$

$$v(t)=X, \text{ which is proportional to } d(i(t))/dt.$$

In an embodiment where 88% of the third harmonic is present in the input primary current, $$i(t)=A*\text{Sin}(\omega t)+A*\text{Sin}(3\omega t),$$

$$v(t)=d(A*\text{Sin}(\omega t)+A*\text{Sin}(3\omega t))/dt, \text{ and}$$

Vpeak of v(t)=(peak voltage due to the fundamental input primary current)+(peak voltage due to 88% of the third harmonic content present in the input primary current).

In an embodiment where circuit breaker 100 has a frame size (steady state current rating) of 400 amps (A), a frequency rating of 50 Hertz (Hz), and an instantaneous trip setting of 2 (2*400 amps=800 amps instantaneous trip level), and an associated Rogowski coil current sensor 135 produces 200 milliVolt (mV) rms output at 400 A input primary current, then the same Rogowski coil current sensor 135 will produce 3*200 mV=600 mV rms if the 400 A primary current is flowing with 150 Hz frequency.

Since the instantaneous protection of the exemplary circuit breaker 100 is provided on peak detection at the instantaneous trip setting of 2, the circuit breaker 100 should trip if the input current becomes 800 A (within a permissible +/−10% tolerance). In terms of Rogowski coil output voltage, the Rogowski coil output voltage at the trip point will be 2*200 mVrms=400 mVrms (+/−10% tolerance).

In the event that 700 A of non-tripping current with 88% third harmonic is present as the input primary current, due to a switching condition in the primary circuit for example, then the primary current will be represented by, $$i(t)=A*\text{Sin}(\omega t)+0.88*A*\text{Sin}(3\omega t).$$

At 700 A, the Rogowski output voltage at 50 Hz is,
[(2*200 mV)/(2*400 A)]*700 A=350 mVrms.
At 700 A, the Rogowski output voltage at 150 Hz is,
0.88*3*350 mV=924 mVrms.

In response to the third harmonic content in the fundamental current being 180 degree phase shifted with respect to the fundamental current component, then the total Rogowski output will be, 350 mVrms+924 mVrms=1274 mVrms, which is greater than the aforementioned 400 mVrms trip level and will result in a nuisance trip condition in the absence of filter 150.

However, in the presence of filter 150, the third harmonic noise component in the output of Rogowski coil current sensor 135 is suppressed, thereby filtering out the 924 mVrms (the third harmonic noise component) signal and leaving only the primary current component of 350 mVrms (the desired non-tripping component). As a result, the electronic trip unit 110 has instantaneous pick-up accuracy equal to +/−10% of the instantaneous pick-up setting.

In view of the foregoing, filter 150 performs the method of conditioning an output signal of current sensor 135 of an electronic circuit breaker 100 by filtering the output signal X of the current sensor 135 to produce a first filtered signal T1 and filtering the first filtered signal T1 to produce a second filtered signal T2, the second filtered signal T2 being representative of the instantaneous primary current 140 of the circuit breaker 100 with an accuracy of equal to or greater than 90%.

The filtering of the output signal X involves filtering the output signal X via a differential low pass filter 155, and the filtering of the first filtered signal T1 involves filtering the first filtered signal T1 via a sixth order low pass Bessel filter 160. In response to the primary current 140 of the circuit breaker 100 having 88% of its third harmonic present, the filtering of the output signal X in combination with the filtering the first filtered signal T1 is such that the third harmonic noise component present in the second filtered signal T2 is suppressed to such an extent that the second filtered signal T2 is representative of the instantaneous primary current 140 of the circuit breaker 100 with an accuracy of equal to or greater than 90%.

As disclosed, some embodiments of the invention may include some of the following advantages: an electronic trip unit having equal to or greater than 90% accuracy in its instantaneous pick-up setting response; the ability to retrofit existing electronic trip units employing a Rogowski coil type current sensor by inserting a combination differential low pass filter and sixth order low pass Bessel filter at the output side of the Rogowski coil; an electronic trip unit that avoids nuisance tripping in the presence of third harmonic switching noise in the primary current; and, an electronic trip unit having an instantaneous peak detection feature that adheres to IEC 947-2.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An electronic filter for filtering the output signal of a current sensor of a circuit breaker, the current sensor having an output signal characteristic similar to that of a Rogowski coil output signal characteristic that includes a third harmonic noise component in response to a switching primary current of the circuit breaker, the circuit breaker having an electronic trip unit with an instantaneous pick-up setting responsive to the output signal of the current sensor, the electronic filter comprising:
a first stage having a first transfer function that defines first characteristic poles, the first stage permitting passage of the third harmonic noise component; and
a second stage having a second transfer function that defines second characteristic poles, the second stage filtering the third harmonic noise component.

2. The filter of claim 1, wherein:
the characteristic poles of the first and second stages are tuned such that the third harmonic noise component is suppressed to such an extent that the electronic trip unit has instantaneous pick-up accuracy equal to +/−10% of the instantaneous pick-up setting.

3. The filter of claim 1, wherein:
the first transfer function comprises a first frequency dependent gain at a defined frequency;
the second transfer function comprises a second frequency dependent gain at the defined frequency; and
at the defined frequency, the second gain is less than the first gain.

4. The filter of claim 1, wherein:
the first stage is a differential low pass filter; and
the second stage is a sixth order low pass Bessel filter.

5. The filter of claim 1, wherein:
in response to the primary current having 88% of its third harmonic present, the third harmonic noise component at the output of the second stage is suppressed to such an extent that the electronic trip unit has instantaneous pick-up accuracy equal to +/−10% of the instantaneous pick-up setting.

6. The filter of claim 1, wherein:
the characteristic poles of the first and second stages are tuned such that all poles are on the left hand side of the s-plane.

7. The filter of claim 1, wherein:
the sixth order low pass Bessel filter has a three-section repeat architecture.

8. The filter of claim 1, wherein:
the second transfer function has a gain value G2 defined by $$G2=1/[(1+a_1s+b_1s^2)\ (1+a_2s+b_2s^2)\ (1+a_3s+b_3s^2)].$$

9. The filter of claim 1, further comprising:
an output signal point P disposed between the first stage and the second stage, the output signal paint P receiving a voltage signal T1 that includes the third harmonic noise component; and
an output signal point Q disposed at an output of the second stage, the output signal point Q receiving a voltage signal T2 that excludes the third harmonic noise component.

10. The filter of claim 1, wherein:
the current sensor is disposed for sensing a primary current of the circuit breaker.

11. The filter of claim 10, wherein:
the primary current comprises one of a three-phase primary current.

12. An electronic trip unit for a circuit breaker having a current sensor with an output signal characteristic similar to that of a Rogowski coil output signal characteristic that includes a third harmonic noise component in response to a switching primary current of the circuit breaker, the electronic trip unit comprising:
a two-stage filter in signal communication with the output of the current sensor, a first stage of the two-stage permitting passage of the third harmonic noise component, and a second stage of the two-stage filter filtering the third harmonic noise component;
a comparator in signal communication with the output of the two-stage filter; and
an actuating circuit in signal communication with the output signal of the comparator;
wherein the electronic trip unit has an instantaneous pick-up setting, and in response to the filtered signal from the two-stage filter, the electronic trip unit has instantaneous pick-up accuracy equal to +/−10% of the instantaneous pick-up setting.

13. The trip unit of claim 12, wherein:
the two-stage filter comprises a first stage having a first transfer function that permits passage of the third harmonic noise component, and a second stage having a second transfer function that filters the third harmonic noise component.

14. The trip unit of claim 13, wherein:
the first stage is a differential low pass filter; and
the second stage is a sixth order low pass Bessel filter.

15. The trip unit of claim 13, wherein:
in response to the primary current of the circuit breaker having 88% of its third harmonic present, the third harmonic noise component at the output of the second stage is suppressed to such an extent that the electronic trip unit has an instantaneous pick-up accuracy equal to or greater than 90%.

16. The trip unit of claim 13, wherein:
the characteristic poles of the first and second stages are tuned such that all poles are on the left hand side of the s-plane.

17. A method of conditioning an output signal of a current sensor of an electronic circuit breaker, the current sensor having an output signal characteristic similar to that of a Rogowski coil output signal characteristic that includes a third harmonic noise component in response to a switching primary current of the circuit breaker, the circuit breaker having an electronic trip unit with an instantaneous pick-up setting responsive to the output signal of the current sensor, the method comprising:

filtering the output signal of the current sensor to produce a first filtered signal, the first filtered signal including the third harmonic noise component; and filtering the first filtered signal to produce a second filtered signal, the second filtered signal being representative of the instantaneous primary current of the circuit breaker with an accuracy of equal to or greater than 90%, the second filtered signal excluding the third harmonic noise component.

18. The method of claim 17, wherein:

filtering the output signal comprises filtering the output signal via a differential low pass filter; and filtering the first filtered signal comprises filtering the first filtered signal via a sixth order low pass Bessel filter.

19. The method of claim 17, wherein:

in response to the primary current of the circuit breaker having 88% of its third harmonic present, the filtering the output signal in combination with the filtering the first filtered signal is such that the third harmonic noise component present in the second filtered signal is suppressed to such an extent that the second filtered signal is representative of the instantaneous primary current of the circuit breaker with an accuracy of equal to or greater than 90%.

\* \* \* \* \*